March 13, 1934.   J. P. SHEARER   1,950,934
PAIL
Filed Dec. 23, 1931
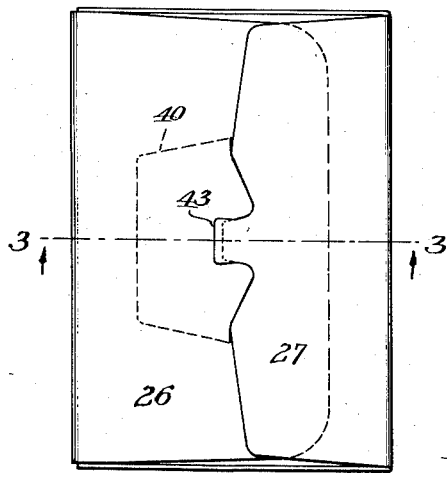
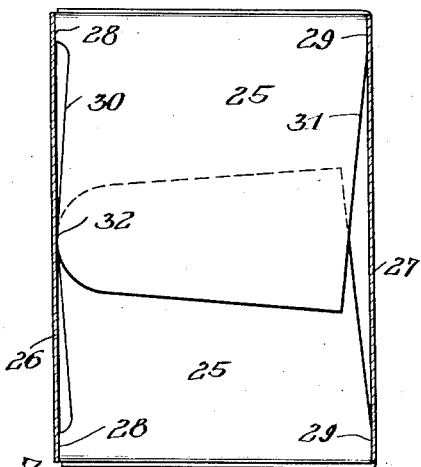
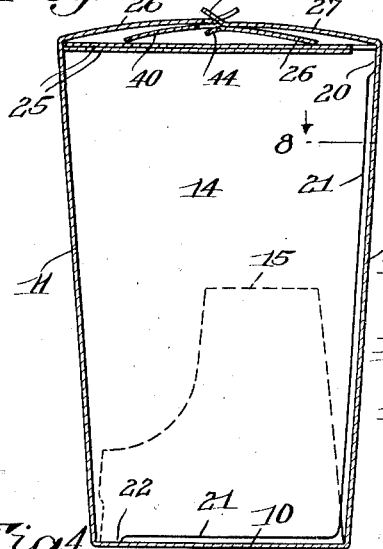
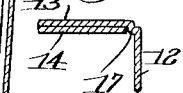
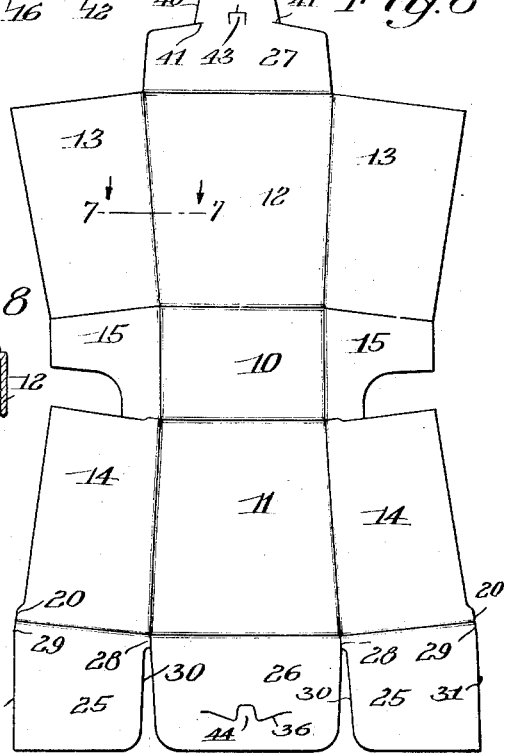
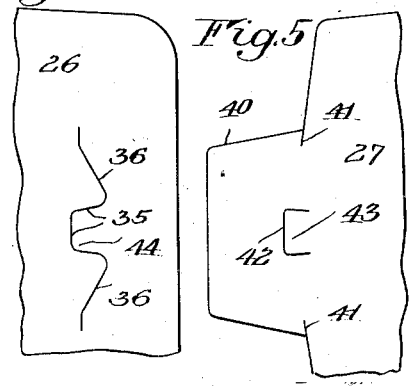
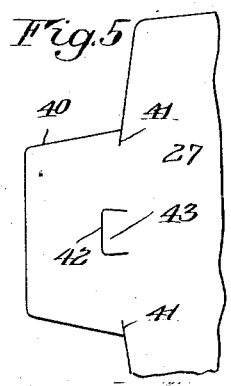
INVENTOR
John P. Shearer
BY
his ATTORNEY Patented Mar. 13, 1934

1,950,934

UNITED STATES PATENT OFFICE 1,950,934

PAIL

John P. Shearer, Newark, N. Y., assignor to Bloomer Bros. Company, Newark, N. Y., a corporation of New York Application December 23, 1931, Serial No. 582,684

8 Claims. (Cl. 229—16)

This invention relates to a pail and more particularly to one of the kind intended primarily for holding more or less liquid contents, such, for example, as an ice cream pail. Such pails are commonly constructed with a tapered body gradually increasing in size from bottom to top and with the bottom closed so as to be capable of holding liquid or semi-liquid contents. In this type of construction, the top of the pail is generally provided with closure flaps capable of being opened to permit access to the interior of the pail, and frequently though not always the pail is provided with a loop or strap handle.

An object of the present invention is to provide a generally improved and more efficient pail, such as described above, particularly adapted for holding a semi-liquid product such as ice cream.

Another object is to provide such a pail which is relatively rigid and strong and in which the closure is relatively tight even at the corners, so as to prevent leakage of the contents.

To these and other ends the invention resides in certain improvements and combinations of parts, all as will be hereinafter more fully described, the novel features being pointed out in the claims at the end of the specification.

In the drawing:

Fig. 1 is a top plan view of a pail constructed in accordance with a preferred embodiment of the invention;

Fig. 2 is a similar view with the two upper flaps cut away;

Fig. 3 is a vertical section taken substantially on the line 3—3 of Fig. 1;

Fig. 4 is a detailed view showing a portion of one of the upper flaps of the pail;

Fig. 5 is a similar detailed view showing a portion of the other upper flap;

Fig. 6 is a view of a blank from which the pail is made;

Fig. 7 is a fragmentary section substantially on the line 7—7 of Fig. 6, and

Fig. 8 is a fragmentary horizontal section substantially on the line 8—8 of Fig. 3.

The same reference numerals throughout the several views indicate the same parts.

The former practice, in selling ice cream in small quantities at retail, was for the retailer, when called upon for a small quantity such as a pint, to scoop the frozen ice cream from a refrigerated can and place it in the pail. Since the ice cream at this time was fairly hard and solid, voids would frequently be left in the corners of the pail, and the packing of the solid ice cream in the pail was usually a time-consuming and messy operation.

According to the more recent practice, on the contrary, the ice cream manufacturer now frequently freezes the ice cream directly in the pails, placing the mixture in the pails in a liquid or semi-liquid condition and then freezing it. Subsequently the pails containing the ice cream are delivered to the retailer and kept by him in a cool place, so that when a purchaser asks for a small quantity of ice cream, the retailer may hand out a filled pail and is spared the messy operation of filling an empty pail with already frozen ice cream.

This change in the manner of using ice cream pails has shown up defects in prior pails which were not fully apparent, and it is to overcome such defects and to provide a pail wholly satisfactory for use according to modern practice, that the present pail has been developed. Under the old practice, when pails were filled with ice cream already frozen to a solid state, leakage or oozing of the ice cream from the pail was not likely to occur and no special safeguards were needed. When the same pails previously used are filled with a liquid or semi-liquid ice cream mixture according to modern practice, however, it is found that when these pails are handled and thereby subjected to twisting and side sway, the mixture tends to ooze out at the corners, thus reducing the amount of mixture retained within the pail and creating an untidy condition of the pail exterior. The present invention provides a pail designed especially to overcome this difficulty and to provide relatively tight closure at the corners and a relatively stiff structural body so that the pail is held square until the mixture is frozen, thus maintaining the full capacity of the pail and its uniformly square shape for compact assembly with other pails, and eliminating the oozing or squirting of the mixture at the corners. By means of such a pail construction the desired appearance and compactness of the frozen mixture, as well as the neat and clean condition of the pail are maintained.

Referring now to the drawing, there is shown a pail according to the preferred embodiment of the invention, the entire pail being formed from a single integral blank of suitably scored and folded sheet material, such as cardboard or the like. The shape of the blank is best shown in Fig. 6 and the folded pail made therefrom is shown in Figs. 1, 2, and 3. It comprises a bottom 10, a front wall 11 hingedly connected to the bottom at its front edge, and a rear wall 12 hingedly connected to the bottom at its rear edge. The terms "front", "rear", "side", and similar expressions as used here and in the accompanying claims are intended merely for convenience of description and not in a limiting sense, since any side of the pail may obviously be considered the front, and the relative position of the parts may be changed at will.

Hinged to each side edge of the rear wall 12 is an outer side wall 13 extending forwardly toward the front wall 11, and hinged to each side edge of the front wall 11 is an inner side wall 14 extending rearwardly toward the rear wall 12 substantially along the inner surface of the outer side wall 13. Side flaps 15 are hingedly connected to the side edges of the bottom 10 and extend upwardly between the walls 13 and 14, which are preferably adhesively connected to each other and to the flaps 15. When the blank is folded up to make the pail, the projecting side of the score line may be folded either in or out. If folded inwardly, as indicated at 17 in Fig. 8, it is apt to form a ridge, ledge, or shoulder along the corner of the body.

It is especially desired to have the pail tight at the corners, and to this end it is desired to have a firm contact between the rear wall 12 and the rear edges of the inner side walls 14 at the upper rear corners thereof. To accomplish this, the edges of each inner side wall 14 are made of the shape best shown in Fig. 3, with a projection 20 at the upper rear corner for contact with the rear wall 12 parallel with the line of contact with said rear wall. Elsewhere the rear and bottom edges of the wall 14 are cut away or relieved as at 21 so as to be out of contact with the rear wall 12 and bottom 10, and another projection 22 is provided along the bottom edge at the forward corner of the pail for tightly engaging the bottom wall on a line parallel therewith.

With this construction, when the inner side wall 14 is moved rearwardly toward the rear wall 12 in making the pail, the first contact between these walls will be at the projection 20 at the corner of the pail. Because the edge of the wall 14 is cut away as at 21, no premature contact of this edge with the bottom 10 or rear wall 12 can occur, which might hold the parts out of contact at the upper corner, where the best contact is desired.

This construction is admirably satisfactory for the purpose of obtaining the desired tight corners, irrespective of whether the pail be folded so that the projections 17 of the score lines 16 extend outwardly, or whether they extend inwardly. In the latter case, the projecting portions 20 and 22 on the wall 14, being of relatively small area as shown, can be easily deflected laterally so that they will slip readily over the ridge, ledge, or shoulder 17 and into contact with the desired surfaces 12 and 10, while the remaining portion of the edges of the wall 14, due to its being cut back or relieved, will remain substantially out of contact with the ledges 17 and thus will not impede the tight contact at the corners.

For closing the top of the pail, closure means are provided, comprising a pair of inner or lower flaps 25, one hingedly connected to the top edge of each side wall 14, and two outer or upper closure flaps 26 and 27 hingedly connected, respectively, to the upper edges of the walls 11 and 12. The lower flaps 25 are of the shape best shown in Figs. 2 and 6. Adjacent their hinged connections with the side walls, they are substantially the full width of the top of the pail so that they will contact firmly with the sides of the top opening at the points 28 and 29 parallel with the line of contact with said side walls to prevent leakage or oozing at the corners of the pail. Beyond these tight corner portions 28 and 29, however, the side edges 30 and 31 of the flaps are relieved or cut away so as to be substantially out of contact with or free from the sides of the pail, as plainly shown in Fig. 2, throughout the major portion of their length. Preferably each of these flaps contacts with one wall of the pail at approximately the middle of the wall, as shown at 32 in Fig. 2, but nevertheless the major portion of each flap is free from the walls of the pail so that the flap may be easily moved to and from proper closed position without substantial frictional resistance. The contact of the flaps with the wall at the middle point 32, however, strengthens the construction and assists in stiffening the upper part of the pail so that deformation thereof is more difficult.

The upper flaps 26 and 27 are adapted to be folded down over the lower flaps 25, and these upper flaps are of the shape best shown in Figs. 1, 4, 5, and 6. The flap 26 has a cut or slit formed therein which has a substantially U-shaped central portion 35, as best shown in Fig. 4, and which is extended to each side of this central U-shaped portion as at 36.

The other upper flap 27 is formed with a projecting tongue 40 which is slightly tapered, as best shown in Fig. 5, and which at its base is of slightly greater width than the length of the slot 36 in the flap 26. Hence when the tongue 40 on the flap 27 is inserted through the slot 36 in the flap 26, the relative dimensions are such that the tongue will be firmly wedged in the slot so that the two flaps will be locked to each other, and relative side swaying of them will be substantially prevented.

To assist in locking the flaps to each other and especially to prevent accidental disengagement of the tongue 40 from the slot 36, the tongue 40 preferably has inwardly extending cuts 41 at its base, as best shown in Fig. 5. When the tongue 40 is thrust home to its normal position in the slit 36, the cuts 41 come opposite the ends of the slit 36 and the ends of the slit engage slightly in the cuts, so as to interlock the parts with each other.

As a further interlock both for preventing side swaying and for holding the tongue 40 against disengagement from the slit 36, the flap 27 is provided with a generally U-shaped cut or slit 42, as best shown in Fig. 5. When the two flaps are brought together in their normal closed position, the tab or portion 43 defined by the cut 42 is forced upward slightly and is wedged relatively tightly into the space between the sides of the U-shaped cut 35, as shown partly in Figs. 1 and 3. Also the portion or tab 44 defined by the U-shaped cut 35 tends, when the flaps begin to be drawn apart, to rise up into the space within the U-shaped cut 42 and thus prevent the flaps from being opened. In Fig. 3 of the drawing, the tab 44 is shown bent slightly downwardly so that it can be more readily seen, but actually in normal use it is either substantially flat or bent slightly upwardly so as to engage in the space within the cut 42, though it could not be readily seen in Fig. 3 if illustrated in its actual position.

It is found in practice, that the construction above described is extremely advantageous and satisfactory for the purpose intended. The full width portions 28 and 29 of the lower flaps 25 provide relatively tight closure at the corners, which is the place where the ice cream mixture is most likely to leak or ooze out while it is still soft. At the same time, since the edges 30 and 31 of these flaps are preferably relieved so as to be out of contact with the sides of the pail, there is substantially no frictional resistance to opening or closing these flaps.

The upper flaps 26 and 27 when folded into proper position and interlocked with each other serve to hold the lower flaps down in proper position and also cover and close the top of the pail at the points where the edges 30 and 31 of the lower flaps do not come into contact with the sides of the pail. The tongue 40 wedged in the slit 36, the tab 43 wedged in the tapered U-shaped portion 35 of the slit as well as the engagement of the tab 44 in the cut 42 all contribute to holding the two upper flaps 26 and 27 firmly relative to each other and prevent side swaying of the flaps. This interlocking of the flaps is so effective in stiffening the pail that the upper part of the pail is not substantially deformed, even when considerable pressure is applied to opposite diagonal corners of the top of the pail. In prior pails of the types previously commonly used, if pressure be applied to the opposite diagonal corners of the top of the pail, considerable deformation of the top takes place and the corners tend to open up so that leakage or oozing of the material is facilitated.

It is thus apparent from the above description that the present invention provides a pail having leak proof corners, particularly at the unglued filling end of the pail, by which the entire liquid contents is retained within the pail, while the interlocking closure means, including the several means described for holding the closure flaps against relative sidewise movement and for locking them in such relation, so as to prevent twisting of the pail, further provides for holding the closely engaging corner portions in their liquid tight relation. As a result the pail is held square while filled with liquid or semi-liquid material to prevent the same from being forced out to spoil the cleanliness and appearance of the pail, and with the further result that the contents are frozen with the box in its intended symmetrical shape by which it is best adapted for compact assembly with other cartons in quantities for packing, storage and transportation.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A tapered pail made of sheet material folded and secured to form a closed bottom and a top opening and closure flaps on opposite sides of said opening, each of said flaps having the side edges thereof formed with portions projecting into tight engagement with the adjoining sides of said opening, said side edges having their remaining portions cut away so as to maintain the engagement of said projecting portions with the sides of said opening, and flap means for connecting the other opposite sides of said opening for maintaining said projecting portions in contact with said opening sides so as to afford a substantially leak proof construction.

2. A set-up, tapered pail made of sheet material folded and secured to form a bottom and sides and a top opening, closure flaps on two opposite sides of said opening for folding in overlapping relation in lower position, closure flaps on the other opposite sides of said opening for folding in overlapping relation over said lower flaps, said lower flaps having side edge portions thereof extended from the fold lines of the flaps parallel and in tight engagement with the adjoining sides of said opening and relieved beyond said extended side edge portions to maintain the contact of the latter with the respective sides of said opening, said upper flaps being provided with cooperating tongue and recess parts arranged for wedging interengagement with each other to firmly secure said upper flaps together against relative sidewise movement and the pail against twisting, and means for locking said upper flaps and parts in engaged relation to afford a substantially leak proof construction.

3. A tapered pail made of sheet material folded to form sides and a top opening, and a plurality of closure flaps formed integrally with the sides of said pail for folding over and closing said opening, one or more of said flaps having a side edge portion thereof extended from the fold line of the flap parallel and in tight engagement with the adjoining side of said pail adjacent the included corner, said edge being cut away and relieved beyond said extended portion to maintain the contact of the latter with the adjoining side of the pail, to afford a substantially leak proof construction.

4. A box made of folded sheet material having a filling opening, flaps folding from opposite sides of said opening to close the same, one of said flaps being formed with a slit therein having a portion of recess shape and forming an included projecting tab, the other of said flaps being provided with a slit therein to form a projecting tab for engagement in said recess slit portion of said first flap to secure said flaps together against relative sidewise movement and the box against twisting, said included tab of said first flap being adapted to engage in the tongue forming slit of said second flap to lock said flaps and parts against disengagement.

5. A box made of folded sheet material having a filling opening, flaps arranged to fold from opposite sides of said opening to close the same, one of said flaps having a slit therein shaped to provide a recess portion, the other of said flaps having a tapered tongue for engagement in said slit and also a slit therein providing a tab for engagement in said recess portion of the slit of said first flap, for securely holding said flaps against relative sidewise movement and the box against twisting.

6. A box made of folded sheet material having a filling opening, flaps arranged to fold from opposite sides of said opening to close the same, one of said flaps having a slit therein formed to provide a portion of recess shape and a tab included in said recess, the other of said flaps being provided with a tapered tongue for engagement in said slit and also with a slit therein to provide a tab for wedging engagement in said recess portion of said first flap to secure said flaps against sidewise movement and said box against twisting, said included tab of said first flap being arranged to engage in said slit of said second flap to lock said flaps and parts against disengagement.

7. A box made of folded sheet material having a filling opening, flaps arranged to fold from opposite sides of said opening to close the same, one of said flaps having a slit formed therein to provide a portion of recess shape and a tab included in said recess, the other of said flaps being formed with a tapered tongue for engagement in the slit of said first flap, said tongue being undercut at the base of each side thereof to provide projecting shoulders for interlocking engagement with the ends of the slit of said first flap, said second flap having a slit cut therein to provide a tab for wedging interengagement with said recess portion of the slit of said first flap, said included tab of said first flap being adapted to engage in said slit of said second flap for additionally locking said flaps and parts against disengagement, for holding said flaps against relative sidewise movement and said box against twisting.

8. A relatively tight closure for a container having a substantially rectangular opening and four walls around said opening, said closure comprising two lower closure flaps hingedly connected to two of said walls on opposite sides of said opening to be folded across said opening in overlapping relation to each other, each of said lower flaps having a side edge formed with a portion for tight engagement with another side of said opening adjacent a corner thereof, said edge being relieved to be substantially out of tight contact with said side for a substantial distance beyond said tightly engaged portion, two upper closure flaps hingedly connected to two other opposite walls to be folded across said opening in overlapping relation to each other over said two lower flaps, and wedging means for connecting said two upper flaps to each other to hold them firmly against sidewise movement relatively to each other to prevent substantial twisting and displacement of said walls adjacent said opening and to maintain said closure relatively tight at the corners of said opening.

JOHN P. SHEARER: